US008839690B2

(12) United States Patent
Huang et al.

(10) Patent No.: US 8,839,690 B2
(45) Date of Patent: Sep. 23, 2014

(54) PARALLEL MECHANISM HAVING THREE-DIMENSIONAL TRANSLATIONS AND ONE-DIMENSIONAL ROTATION

(75) Inventors: Tian Huang, Tianjin (CN); Haitao Liu, Tianjin (CN); Yimin Song, Tianjin (CN); Xueman Zhao, Tianjin (CN); Jiangping Mei, Tianjin (CN); Limin Zhang, Tianjin (CN); Panfeng Wang, Tianjin (CN)

(73) Assignee: Tianjin University, Tianjin (CN)

( * ) Notice: Subject to any disclaimer, the term of this patent is extended or adjusted under 35 U.S.C. 154(b) by 262 days.

(21) Appl. No.: 13/508,733

(22) PCT Filed: Jan. 15, 2010

(86) PCT No.: PCT/CN2010/070216
§ 371 (c)(1),
(2), (4) Date: May 9, 2012

(87) PCT Pub. No.: WO2011/054195
PCT Pub. Date: May 12, 2011

(65) Prior Publication Data
US 2012/0227532 A1    Sep. 13, 2012

(30) Foreign Application Priority Data
Nov. 9, 2009   (CN) .......................... 2009 1 0228105

(51) Int. Cl.
*B25J 17/00* (2006.01)
*B25J 17/02* (2006.01)
*B25J 9/00* (2006.01)

(52) U.S. Cl.
CPC ............ *B25J 17/0266* (2013.01); *B25J 9/0051* (2013.01); *Y10S 901/26* (2013.01); *Y10S 901/27* (2013.01)

USPC ............................ 74/490.06; 901/26; 901/27

(58) Field of Classification Search
USPC .............. 74/490.01, 490.05, 490.03, 490.06, 74/490.08; 901/25, 30, 27, 28, 29; 414/734, 735, 738, 742, 743
See application file for complete search history.

(56) References Cited

U.S. PATENT DOCUMENTS

| | | | |
|---|---|---|---|
| 2001/0019692 A1* | 9/2001 | Ehrat ............................ | 414/735 |
| 2004/0028516 A1* | 2/2004 | Brogardh ...................... | 414/735 |
| 2004/0143876 A1* | 7/2004 | Persson et al. ................... | 901/1 |
| 2006/0182602 A1* | 8/2006 | Schuler et al. ................ | 414/735 |
| 2006/0182603 A1* | 8/2006 | Hawes .......................... | 414/735 |
| 2007/0138374 A1* | 6/2007 | Nishibashi et al. ......... | 250/208.1 |
| 2007/0151117 A1* | 7/2007 | McMurtry .................... | 33/558.2 |
| 2008/0141813 A1* | 6/2008 | Ehrat .......................... | 74/490.01 |
| 2008/0257092 A1* | 10/2008 | Nihei et al. ................ | 74/479.01 |
| 2010/0031767 A1* | 2/2010 | Chenu ......................... | 74/490.05 |
| 2010/0186534 A1* | 7/2010 | Kinoshita et al. .......... | 74/490.06 |
| 2010/0206120 A1* | 8/2010 | Kinoshita et al. .......... | 74/490.06 |
| 2010/0263471 A1* | 10/2010 | Weber ........................ | 74/490.06 |

(Continued)

Primary Examiner — David M Fenstermacher
(74) Attorney, Agent, or Firm — George G. Wang; Bei & Ocean

(57) ABSTRACT

A parallel mechanism with three-dimensional translation and one-dimensional rotation include a fixing rack, a mobile platform and four chains of the same structure which are symmetrically set between the fixing rack and the mobile platform. Each chain has a near rack rod and two parallel far rack rods. The mobile platform includes a main platform and an assistant platform connected by a revolute joint and perpendicular to each other. Each end of the main platform and the assistant platform is connected with a corresponding lower connecting shaft separately.

8 Claims, 3 Drawing Sheets

(56) References Cited

U.S. PATENT DOCUMENTS

| | | | |
|---|---|---|---|
| 2011/0033275 A1* | 2/2011 | Lehmann | 414/737 |
| 2011/0072929 A1* | 3/2011 | Feng | 74/479.01 |
| 2011/0097184 A1* | 4/2011 | Kinoshita et al. | 414/589 |
| 2011/0100145 A1* | 5/2011 | Feng | 74/490.01 |
| 2011/0113914 A1* | 5/2011 | Zhang et al. | 74/490.01 |
| 2011/0113915 A1* | 5/2011 | Zhang et al. | 74/490.01 |
| 2011/0120254 A1* | 5/2011 | Zhang et al. | 74/490.04 |
| 2011/0129323 A1* | 6/2011 | Ehrat | 414/738 |
| 2011/0132131 A1* | 6/2011 | Worz | 74/490.05 |
| 2011/0154936 A1* | 6/2011 | Zhao et al. | 74/490.04 |
| 2011/0170998 A1* | 7/2011 | Winkler | 414/564 |
| 2012/0079908 A1* | 4/2012 | Long | 74/490.05 |
| 2012/0103124 A1* | 5/2012 | Herder et al. | 74/490.01 |
| 2012/0207574 A1* | 8/2012 | La Rovere et al. | 414/751.1 |
| 2012/0227532 A1* | 9/2012 | Huang et al. | 74/490.05 |
| 2012/0266713 A1* | 10/2012 | Feng | 74/490.05 |
| 2012/0272773 A1* | 11/2012 | Monti | 74/490.03 |
| 2013/0042714 A1* | 2/2013 | Liu et al. | 74/490.02 |
| 2013/0164107 A1* | 6/2013 | Pehlivan et al. | 414/732 |
| 2013/0189063 A1* | 7/2013 | Brogardh et al. | 414/589 |
| 2013/0205932 A1* | 8/2013 | Fukudome et al. | 74/490.01 |
| 2013/0209209 A1* | 8/2013 | Fukudome et al. | 414/729 |
| 2013/0319157 A1* | 12/2013 | Yang | 74/490.03 |
| 2013/0340561 A1* | 12/2013 | Kim et al. | 74/490.12 |
| 2014/0020500 A1* | 1/2014 | Briot et al. | 74/490.05 |
| 2014/0037413 A1* | 2/2014 | Takashima et al. | 414/680 |
| 2014/0060230 A1* | 3/2014 | Nagayama | 74/490.01 |
| 2014/0060234 A1* | 3/2014 | Uemura | 74/490.05 |
| 2014/0069222 A1* | 3/2014 | Souk | 74/490.02 |

* cited by examiner

PARALLEL MECHANISM HAVING THREE-DIMENSIONAL TRANSLATIONS AND ONE-DIMENSIONAL ROTATION

TECHNICAL FIELD

The present invention is related to a robot, particularly a parallel mechanism of robot with spatial three-dimensional translation and one-dimensional rotation.

BACKGROUND OF THE INVENTION

It is known from patent documents US20090019960A1 and EP1084802B1 that the existing parallel mechanism with three-dimensional translation and one-dimensional rotation comprises four driving chains and a mobile platform, each chain comprises a near rack rod and a far rack rod. One end of the near rack rod has only one translational or rotational degree of freedom relative to the fixing rack, while the other end connects with one end of the far rack rod via a hinge having only two rotational degrees of freedom. The other end of the far rack rod connects with the mobile platform through a hinge having only two rotational degrees of freedom to enable translation of the mechanism. The mobile platform is composed of four parts, two of which are parallel while the other two are connected with the parallel ones via rotational hinges. Rotation of the parts realizes the rotational degree of freedom around the axis perpendicular to the mobile platform. The rotation range can be enlarged through suitable amplifiers. The above mechanism is restricted to rotate only around the axis perpendicular to the mobile platform.

SUMMARY OF THE INVENTION

In order to solve the technical problem in the prior art, the present invention provides a parallel mechanism with three-dimensional translation and one-dimensional rotation which is able to rotate around horizontal axis.

Specifically, the present invention provides a parallel mechanism with three-dimensional translation and one-dimensional rotation comprising a fixing rack, a mobile platform and four chains of the same structure which are symmetrically arranged between the fixing rack and the mobile platform. Each chain consists of a near rack rod and two parallel far rack rods. One end of the near rack rod connects with the driving end fixed on the fixing rack, while the other end is fixed to the upper connecting shaft. One end of the far rack rod is spherically hinged with the upper connecting rod, while the other end is spherically hinged with the lower connecting shaft which is fixed to the mobile rack. The mobile platform comprises a main platform and an assistant platform which are connected via revolute joint and perpendicular to each other. The two ends of the main platform and assistant platform connect with the corresponding said lower connecting shaft respectively.

A reversing mechanism is set between the main platform and assistant platform.

The reversing mechanism can be arranged with one set or parallel multiple sets.

The reversing mechanisms are mounted on two sides of the assistant platform symmetrically. The reversing mechanism mounted on each side of the assistant platform comprises one set or parallel multiple sets.

The reversing mechanism comprises a driving bevel gear fixed to the assistant and a driven bevel gear engaging the driving gear and fixed to the main platform.

The axis of the main platform is parallel with the axis of the lower connecting shaft which is linked with the assistant platform.

The present invention is advantageous and desirable in that it provides a simple structure and definite movement mode to enable sophisticated grabbing or releasing operations. The symmetrically arranged driving ends improve the rigidity of the work space. Meanwhile, rotational degrees of freedom on three orthographic directions can be realized by interchanging the main platform and assistant platform, or by utilizing a reversing mechanism.

In the figures, 1 shows the fixing rack; 2 shows the near rack rod; 3 shows the upper connecting shaft; 4 shows the lower connecting shaft; 5a, 5b, 6a, 6b show the spherical hinge; 7 shows the far rack rod I; 8 shows the far rack rod II; 9 shows the assistant platform; 10 shows the main platform; 11 shows the mobile platform; 12 shows the axis of main platform; 13 shows the driving end; 14 shows the bearing bush; 15 shows the driven bevel gear; 16 shows the driving bevel gear; and 17 shows the reversing mechanism.

DETAILED DESCRIPTION OF THE INVENTION

In order to further understand the content, characteristics and effects of the present invention, the following embodiments are described and explained with the drawings.

Figure 1:
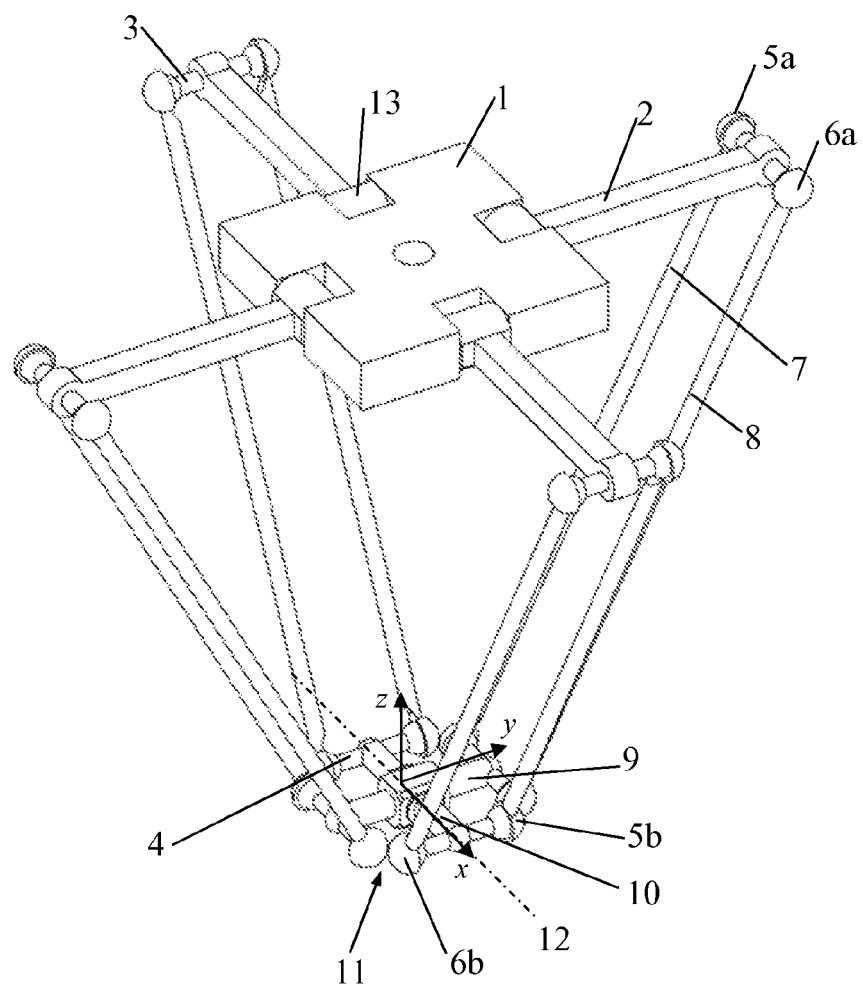
FIG. 1 shows the schematic diagram of the structure of the present invention.
Figure 2:
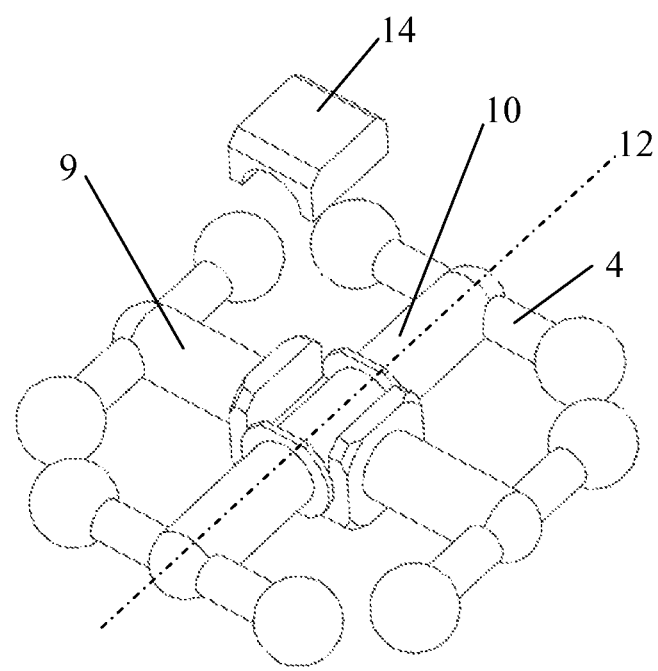
FIG. 2 shows the schematic diagram of the structure of mobile platform according to the present invention.

With reference to FIG. 1 and FIG. 2, the present invention provides a parallel mechanism with three-dimensional translation and one-dimensional rotation, comprising fixing rack 1, mobile platform 11 and four chains of the same structure symmetrically placed between the fixing rack 1 and mobile platform 11. Each chain consists of near rack rod 2, far rack rod I (7), far rack rod II (8) and upper connecting shaft 3 which connects the near rack rod 2, far rack rod 7 and far rack rod 8. One end of the near rack rod 2 is fixed to driving end 13 of fixing rack 1, while the other end is fixed to upper connecting shaft 3. The far rack rod 7 and far rack rod 8 are parallel, one end connecting with the upper connecting shaft 3 via spherical hinge 5a and 6a respectively, and the other end spherically hinged via spherical hinge 5b and 6b with lower connecting shaft 4 which is fixed on mobile platform 11. The driving end 13 of fixing rack 1 provides one rotational degree of freedom to near rack rod 2. Mobile platform 11 comprises main platform 10, assistant platform 9 and bearing bush 14, main platform 10 connecting perpendicularly with assistant platform 9 through revolute joint. The above mentioned structure restricts three rotational degrees of freedom of main platform 10. Assistant platform 9 is able to rotate around axis 12 of main platform 10, by which three-dimensional translation of main platform can be realized. Rotation around axis x can be switched to rotation around axis y by interchanging main platform 10 and assistant platform 9 of the mobile platform 11.

Main platform 10 and assistant platform 9 connects perpendicularly to the corresponding lower connecting shaft respectively. The axis of main platform 10 is parallel with the axis of lower connecting shaft 4 which is linked to assistant platform 9. Thus, the structure achieves high rigidity and force equilibrium to assure stability of movement.

Figure 3:
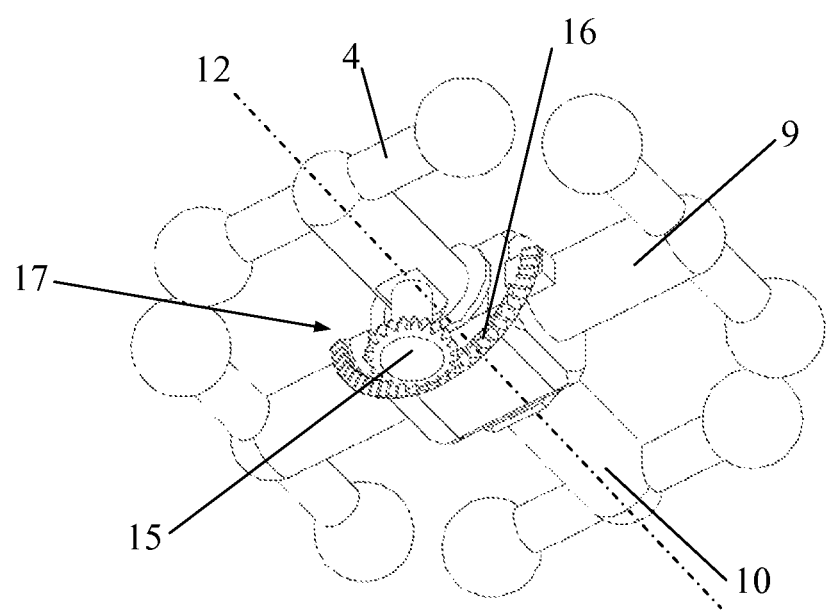
FIG. 3 shows the schematic diagram of the structure of the mobile platform with reversing mechanism according to the present invention.

With reference to FIG. 3, the mobile platform 11 with reversing mechanism 17 enables rotation around the axis perpendicular to mobile platform 11. The reversing mechanism 17 consists of driven bevel gear 15 and driving bevel gear 16. The driving bevel gear 16 fixed to assistant platform 9 is able to rotate along with the assistant platform. Rotation of driving bevel gear 16 around axis 12 of main platform can be switched to rotation around axis perpendicular to the mobile platform by fixing the driven bevel gear 15 vertically to a point of main platform 10. Reversing mechanism placed between the main platform 10 and assistant platform 9 enables rotation around axis z.

The reversing mechanism achieves reversing function by utilizing multi-stage bevel gear, or one set of gear pair which has a simple structure and is easy to be executed, or other reversing mechanisms may also be used. The reversing mechanism can be adopted as singe set installed individually or parallel placed multiple sets along the axis of the main platform for the purpose of adopting multiple terminal actuators. Two sets or multiple sets of the reversing mechanisms can be placed symmetrically on two sides of the assistant platform to achieve inertia balance of the main platform movement.

The present invention is different from prior arts in that
i) mobile platform 11 comprises two parts which are able to rotate around and perpendicular to each other;
ii) main platform 10 and assistant platform 9 are interchangeable;
iii) rotation of assistant platform 9 around axis 12 of main platform can be converted via reversing mechanism 17 to rotation around the axis perpendicular to the mobile platform.

The present invention provides a simple structure and definite movement mode to enable sophisticated grabbing or releasing operation. The symmetrically arranged driving ends improve the rigidity of the work space. Meanwhile, rotational degrees of freedom in different directions can be realized by interchanging the main platform and assistant platform, or by utilizing a reversing mechanism.

Although preferred embodiments of the present invention have been shown and described with figures, the present invention is not limited to the aforementioned embodiments. The above embodiments are described by way of illustration and not limitation. Various modifications and substitutions made by people of ordinary skill in the art enlightened by the present invention without departing from the spirit of the invention shall fall within the scope of protection of the present invention.

What is claimed is:

1. A parallel mechanism with three-dimensional translation and one-dimensional rotation, comprising a fixing rack, a mobile platform and four chains; each of said four chains comprising linked rods and connecting said fixing rack and said mobile platform; said mobile platform comprising a main platform and an assistant platform connected to each other by a revolute joint and perpendicular to each other and said assistant platform being able to rotate around the axis of said main platform, and further comprising one or more reversing gears between said main platform and assistant platform.

2. The parallel mechanism of claim 1, wherein each of said four chains comprises a near rack rod and two parallel far rack rods, a first end of said near rack rod being connected to said fixing rack, and a second end of said near rack rod being connected to an upper connecting shaft; a first end of each said far rack rod being spherically hinged on said upper connecting shaft, and a second end of each said far rack rod being spherically hinged on a lower connecting shaft mounted on said mobile platform.

3. The parallel mechanism of claim 2, wherein each end of said main platform and assistant platform is connected to one of four lower connecting shafts.

4. The parallel mechanism of claim 1, wherein said reversing gears are arranged as one set.

5. The parallel mechanism of claim 1, wherein said reversing gears are arranged in multiple sets.

6. The parallel mechanism of claim 1, wherein said reversing gears are symmetrically mounted on two sides of said assistant platform in one or more sets.

7. The parallel mechanism of claim 1, wherein said reversing gears comprise a driving bevel gear fixed on said assistant platform, and a driven bevel gear which engages said driving bevel gear and is fixed on said main platform.

8. The parallel mechanism of claim 3, wherein an axis of said main platform is parallel with an axis of a lower connecting shaft which is connected with said assistant platform.

* * * * *